United States Patent [19]

Belcher

[11] 4,391,551
[45] Jul. 5, 1983

[54] SNAKE CLEANABLE FLUID FLOW SYSTEM

[75] Inventor: Walter C. Belcher, 20221 Melvin, Livonia, Mich. 48152

[73] Assignees: Walter C. Belcher; Gloria Jeanne Belcher, both of Livonia, Mich.

[21] Appl. No.: 126,213

[22] Filed: Mar. 3, 1980

[51] Int. Cl.³ .................................................. F16L 45/00
[52] U.S. Cl. ..................................... 405/43; 52/169.14; 138/37; 15/104.03; 285/150; 285/156
[58] Field of Search .................. 52/169.14; 405/43; 138/37; 15/104.3 SN; 285/119, 156, 155

[56] References Cited

U.S. PATENT DOCUMENTS

| 186,411 | 1/1877 | Church | 138/37 X |
|---|---|---|---|
| 1,275,117 | 8/1918 | Winters | 138/37 X |
| 1,821,949 | 9/1931 | Selah | 138/37 X |
| 1,982,402 | 11/1934 | Shade | 15/104.3 SN |
| 2,506,206 | 5/1950 | Fulton | 285/155 X |
| 2,525,399 | 10/1950 | Collison | 285/156 X |
| 2,911,235 | 11/1959 | Stumbough | 285/93 |
| 3,572,391 | 3/1971 | Hirsch | 138/37 X |
| 4,136,500 | 1/1979 | Difiore | 52/169.14 X |

FOREIGN PATENT DOCUMENTS

| 568963 | 1/1933 | Fed. Rep. of Germany | 138/37 |
|---|---|---|---|
| 923492 | 4/1963 | United Kingdom | 138/37 |

*Primary Examiner*—Thomas F. Callaghan
*Attorney, Agent, or Firm*—Michael L. Bauchan

[57] ABSTRACT

A snake cleanable fluid flow system is provided which incorporates a first fitting in the form of a clean-out elbow and a second fitting in the form of a tee. Each of the fittings have a first passageway open at each end and a second passageway intersecting the first passageway. The clean-out elbow is provided with a baffle which selectively directs a snake inserted in its second passageway into a predetermined end of the first passageway. The tee also has a baffle which diverts a snake inserted into either end of its first passageway into its second passageway. The tee and clean-out elbow are connected by a pipe and a partitioned pipe is connected to the second passageway of the clean-out elbow so as to facilitate insertion of a snake. The baffles facilitate cleaning the fluid flow system by deflecting the snake inserted in the clean-out elbow and tee.

12 Claims, 6 Drawing Figures

SNAKE CLEANABLE FLUID FLOW SYSTEM

Numerous fluid flow systems are in common usage. Many of them, particularly drainage systems designed to direct flow of ground water from next to a building foundation, occasionally become plugged by foreign objects. When such systems become plugged, the most expedient way of correcting the blockage is to direct a semirigid instrument into part of the fluid flow system so as to force it through the blockage and let the fluid flow wash out the blockage material. In the case of a solid object, such as a piece of cloth material, the snake often snarls in the object and upon withdrawing the snake, the object may be pulled out of the fluid flow system.

For purposes of the drawings and description which follow, the subject invention is presented as part of a fluid flow system specifically adapted for use in a drainage system used to drain water from the ground next to a building foundation. Such drainage systems are in common usage and are utilized to protect such foundations from water seepage, water pressure, heaving due to freezing water, and various other problems commonly known to those persons versed in the art.

Fluid flow systems may become blocked from many sources. Drainage systems to remove water from around a building foundation incorporate seepage lines in the form of perforated drain pipes around a building foundation through which water drains from the ground. Sand, minerals, and other impurities in the ground enter the perforated drain pipes with the ground water and periodically contribute to blockage of the drain system.

It is therefore common in drainage systems to provide a clean-out fitting specifically adapted to facilitate insertion of a snake into a portion of the drainage system. Snakes employed for such purpose often are cylindrical and may be hand driven or motor propelled so as to rotate while being inserted into the drainage system. Other commonly used snakes are in the form of a long slender piece of flexible steel.

Drainage systems usually incorporate straight pipes and fittings of various configurations which serve to connect the pipes. Common types of fittings are an elbow fitting which contain a passageway having an axis that curves 90°, a tee fitting which has a straight first passageway and a second passageway intersecting the first passageway at right angles, and fittings having a passageway on an axis that curves 45° or 135° which contain a first passageway having an axis at such angles as 45° and 135° to the axis of a second passageway.

A common problem with drainage systems is that the semirigid snakes used to clean such systems could not selectively clean predetermined parts of the drainage system. Another common problem with such drainage systems is that when a snake enters a tee at right angles to a passageway, it tends to not negotitate the required turn in the passageway and so either the snake becomes jammed or it may enter either end of the passageway without the user being able to select the direction of the snake travel.

Shade U.S. Pat. No. 1,982,402 is a U.S. patent on a tool for cleaning fluid flow systems designed to direct the movement of a snake in a tee fitting. A problem with Shade is that the user needs to acquire the special tool to selectively clean the drainage system. Another problem with Shade is that the tool can be inserted in a first fitting to direct the snake in a desired direction of travel, but after the snake passes through a pipe into a second fitting, the user does not have any continuing control of the snake direction of travel in the second fitting. Shade is thus limited to use only in those fittings which are accessible by the person desiring to clean the system.

Stumbough U.S. Pat. No. 2,911,235 is another U.S. patent in which a clean-out fitting is provided which provides an inclined surface to facilitate a snake entering one passageway of a fitting being redirected into a second passageway of the fitting. However, the apparatus of Stumbough does not provide a way of selecting snake travel when it enters a fitting and has two possible directions of travel.

It is therefore an object of this invention to provide apparatus for use in a snake cleanable fluid flow system which includes a fitting having first and second passageways and a baffle that selectively directs a snake entering one of said passageways in a predetermined direction as it passes through the other of the passageways.

It is a further object of this invention to provide apparatus for use in a snake cleanable fluid flow system that includes a unique clean-out elbow fitting having a first passageway defined by two ends and a second passageway intersecting the first passageway between the ends and a baffle in the second passageway for selectively directing a snake entering the second passageway into a predetermined end of the first passageway, the baffle being positioned out of the first passageway so as to not interfere with fluid flow or snake travel from one end of the first passageway to the other end of the first passageway.

It is yet another object of this invention to provide apparatus for use in a snake cleanable fluid flow system that includes a tee having a first passageway defined by two ends and a second passageway intersecting the first passageway between the ends, the tee having a baffle in the first passageway at the point of intersection for directing a snake inserted into either end of the first passageway into the second passageway and which also serves to direct a snake entering the second passageway into a predetermined end of the first passageway.

It is yet another object of this invention to provide a partitioned pipe having a longitudinal partition for use in connection with a clean-out fitting to facilitate inserting a snake in a predetermined cross section of a passageway in the clean-out fitting, the clean-out fitting having a baffle which deflects the snake inserted through the partitioned pipe in a predetermined direction in a passageway of the fitting depending upon the cross section area of the partitioned pipe in which the snake is inserted.

It is yet another object of this invention to provide a snake cleanable fluid flow system which includes a partitioned pipe connected to a clean-out fitting having a baffle, the clean-out fitting being connected to at least one other fitting by means of a connecting pipe, the other fitting also having a snake directing baffle so that a snake inserted in the partitioned pipe is selectively deflected by the clean-out fitting baffle through the connecting pipe so as to pass through the other fitting, the snake being deflected in each fitting by a snake deflecting baffle.

The foregoing and other objects and advantages of this invention will become apparent from the accompanying drawings and from the following description.

SUMMARY OF THE INVENTION

This invention is of a unique snake cleanable fluid flow system which employs a partitioned pipe, a clean-out fitting in which is positioned a snake deflecting baffle, a second fitting in which is positioned a snake deflecting baffle, and pipe which connects the respective fittings. Accordingly, a snake inserted on either side of the partitioned pipe is deflected by a baffle in the clean-out fitting in a predetermined direction through a pipe to the second fitting, in which the snake is deflected by a baffle in the second fittings so as to pass through the second fitting in a predetermined direction. By knowing the configuration of the system, a person may thus selectively clean a large section of the system by selecting the location in which the snake is inserted and as the snake enters each fitting, it is deflected in the desired predetermined direction so as to clear a suspected blockage believed to exist at a predetermined location.

DISCUSSION OF THE DRAWINGS

This invention will be better understood from the following description in conjunction with the accompanying drawings, in which.

DESCRIPTION OF THE PREFERRED EMBODIMENT

Figures 1, 2:
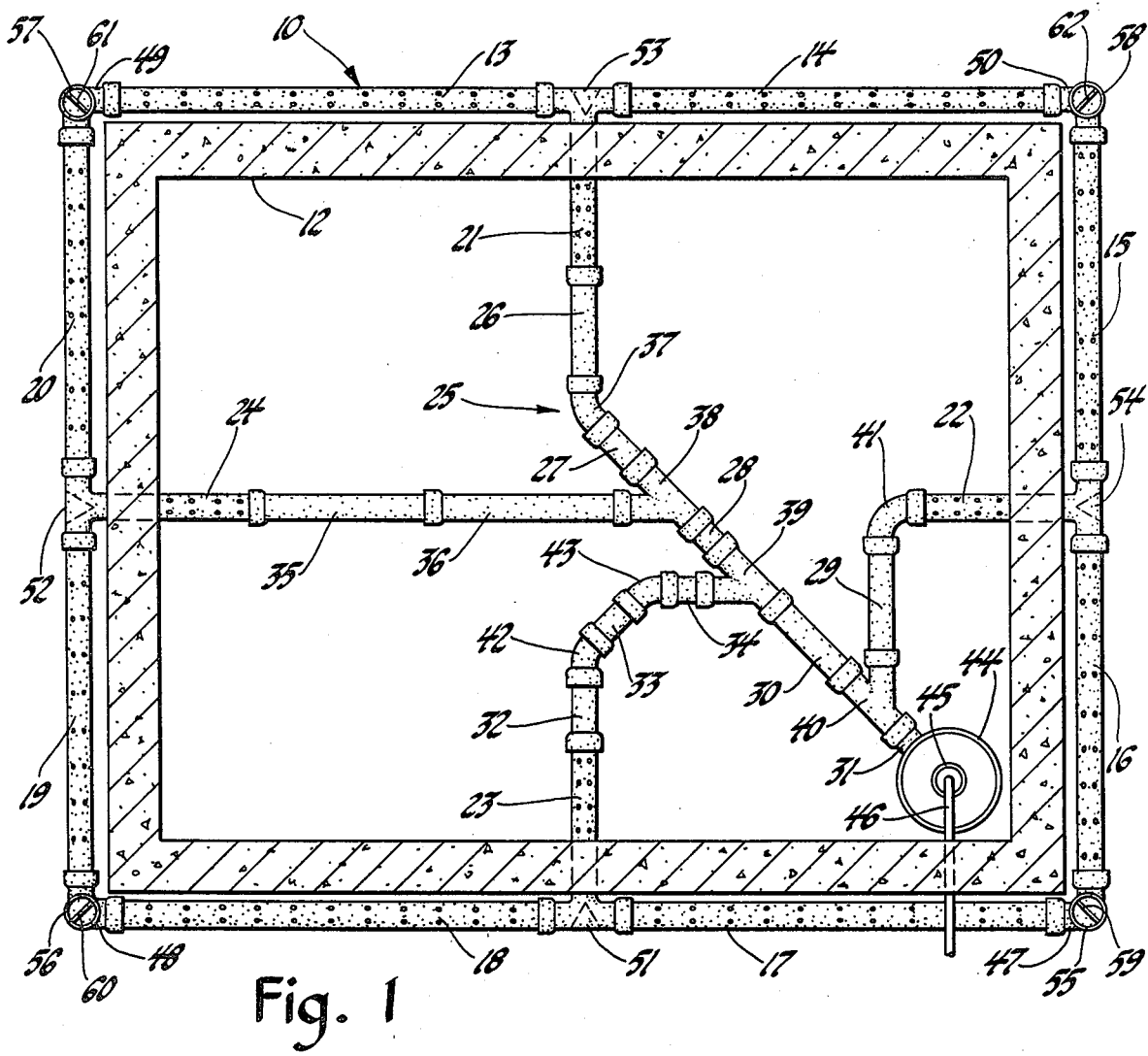
FIG. 1 is a plan view of a snake cleanable fluid flow system embodying the principles of the subject invention.
FIG. 2 is a partial perspective view of the fluid flow system in FIG. 1.

As shown in FIG. 1, a fluid flow system 10 is illustrated embodying the principles of the subject invention. For purposes of this Specification, the system 10 is in the form of a drainage system for draining water around the foundation 12 of a building.

The system 10 includes several conventional drainage system elements, including perforated pipes 13 through 20 outside the foundation 12, perforated pipes 21 through 24 which extend under the foundation 12, and interior drain apparatus 25 which includes various solid wall pipes 26 through 36 and fittings 37 through 43. The interior drain apparatus 25 drains water from the perforated pipes 21 through 24 to a conventional sump basin 44 in which is located a conventional sump pump 45 which pumps the water out of the sump basin 44 through a sump line in the form of a pipe 46 through the foundation 12 to a suitable remote location away from the foundation 12.

The fluid flow system 10 in the illustrated embodiment also includes four clean-out elbow fittings 47 through 50 of a first configuration and four tee fittings 51 through 54 which incorporate the principles of the subject invention and which connect the perforated pipes 13 through 24. Partitioned pipes 55 through 58 having longitudinal partitions 59 through 62 parallel to their longitudinal axis are positioned on top of the respective clean-out elbow fittings 47 through 50.

Since most of the fluid flow system 10 is positioned beneath the surface of the ground outside the foundation 12 in a manner common to persons versed in the art, the partitioned pipes 55 through 58 are provided of a suitable length to extend above the clean-out elbow fittings 47 through 50 to the level of the surrounding ground. This is illustrated in FIG. 2, which is a perspective view of the corner where clean-out elbow fitting 47 is located. At the ground level, a suitable cover is placed on the top of each of the partitioned pipes 55 through 58 to prevent dirt or other contaminants entering the same in a manner familiar to persons versed in the art.

While in the illustrated embodiment each of the various fittings 47 through 54 and 37 through 43 are illustrated as having an enlarged end in which one end of a pipe may be inserted, each of the pipes being of the same outside diameter from end to end, persons versed in the art will appreciate that the respective pipes could be made with enlarged ends for connection to the various fittings without departing from the spirit of the invention. For convenience in illustration, all of the pipes in the illlustrated embodiment have the same inside and outside diameter and are cylindrical. The various pipes may be of any suitable material. At the present time, polyvinyl chloride, commonly known as PVC, is a very satisfactory material for the construction of pipes and fittings of the type illustrated in the system 10 as the material is quite rigid and long lasting, but is easy to cut and connect to adjoining sections.

Figure 3:
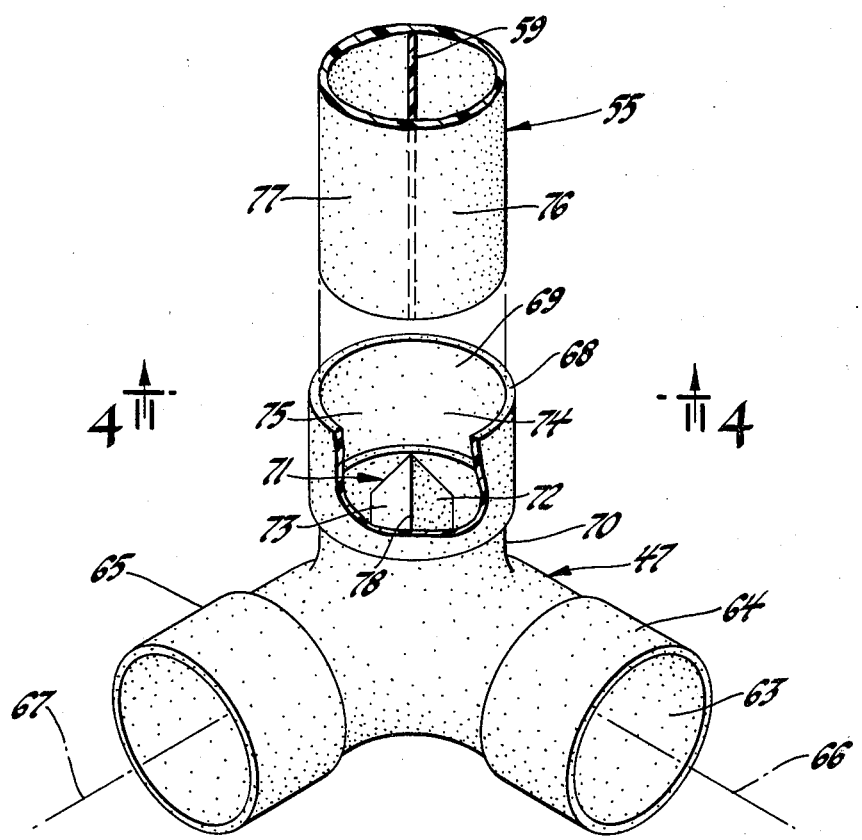
FIG. 3 is a perspective view with parts removed of a partitioned pipe and clean-out elbow fitting shown in FIG. 2.

As shown in FIG. 3, the clean-out elbow fitting 47 is the first fitting shown in detail in the drawings and it includes a first passageway 63 having a first tubular end 64 and a second tubular end 65 which have respective first and second axes 66 and 67. The top of the clean-out elbow fitting 47 is a tube 68 which forms a second passageway 69 connected to the first passageway 63 at a junction 70 between the ends 64 and 65, at the intersection of the passageways 63 and 69 at the junction 70 so that fluid in each of the passageways 63 and 69 may freely flow into the other passageway.

In the illustrated embodiment in FIG. 3, a baffle 71 is provided having a first snake deflecting surface 72 and a second snake deflecting surface 73. The surfaces 72 and 73 are inclined to fluid flow in the second passageway 69 so that if a snake enters the clean-out elbow fitting 47 through a first cross section area of the second passageway 69, the first snake deflecting surface 72 will deflect the snake into the first tubular end 64 of the clean-out elbow fitting 47 so as to enter the first end of the first passageway 63 and if a snake enters clean-out fitting 47 through a second cross section area 75 of the second passageway 69 the second snake deflecting surface 73 deflects the snake into the second tubular end 65 of the clean-out elbow fitting 47 so the snake enters the second end of the first passageway 63 and exits the clean-out elbow fitting 47 substantially along the second axes 67.

As shown in FIG. 3, in the illustrated embodiment the partitioned pipe 55 has a partition 59 extending the length of the pipe 55 so as to divide the pipe 55 cross section area into a first side 76 and a second side 77. The pipe 55 is inserted in the tube 68 of the clean-out elbow fitting 47 so the end of the partition 59 in the clean-out elbow fitting 47 is positioned along the edge 78 of the baffle 71 where the surfaces 72 and 73 are joined.

Figure 4:
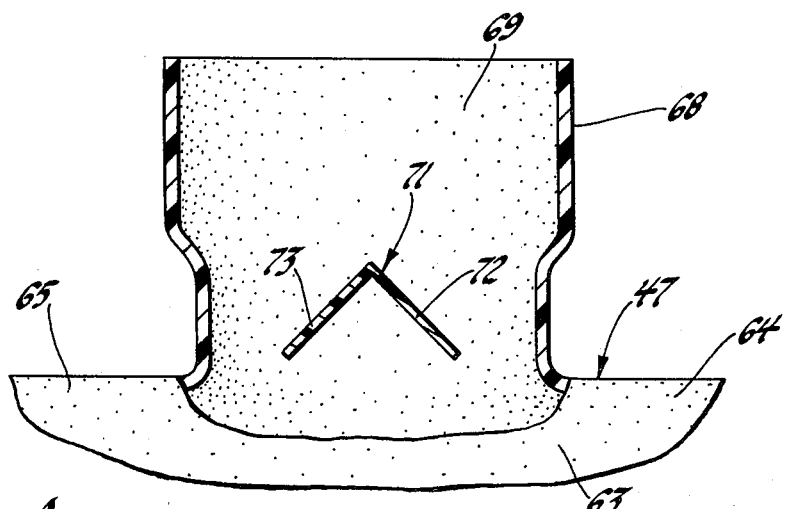
FIG. 4 is a partial cross section view of the clean-out fitting in FIG. 3 taken along the lines 4—4.

As shown in FIG. 4, the baffle 71 is positioned in the second passageway 69. The baffle 71 thus deflects a snake entering the clean-out elbow fitting 47 through the second passageway 69 but a snake entering the clean-out elbow fitting 47 through the first passageway 63 does not strike the baffle 71 and thus may pass through the first passageway 63 from one end to the other without striking the baffle 71, though the snake will change direction in the passageway 63 by being deflected by the walls of the passageway 63.

Figure 5:
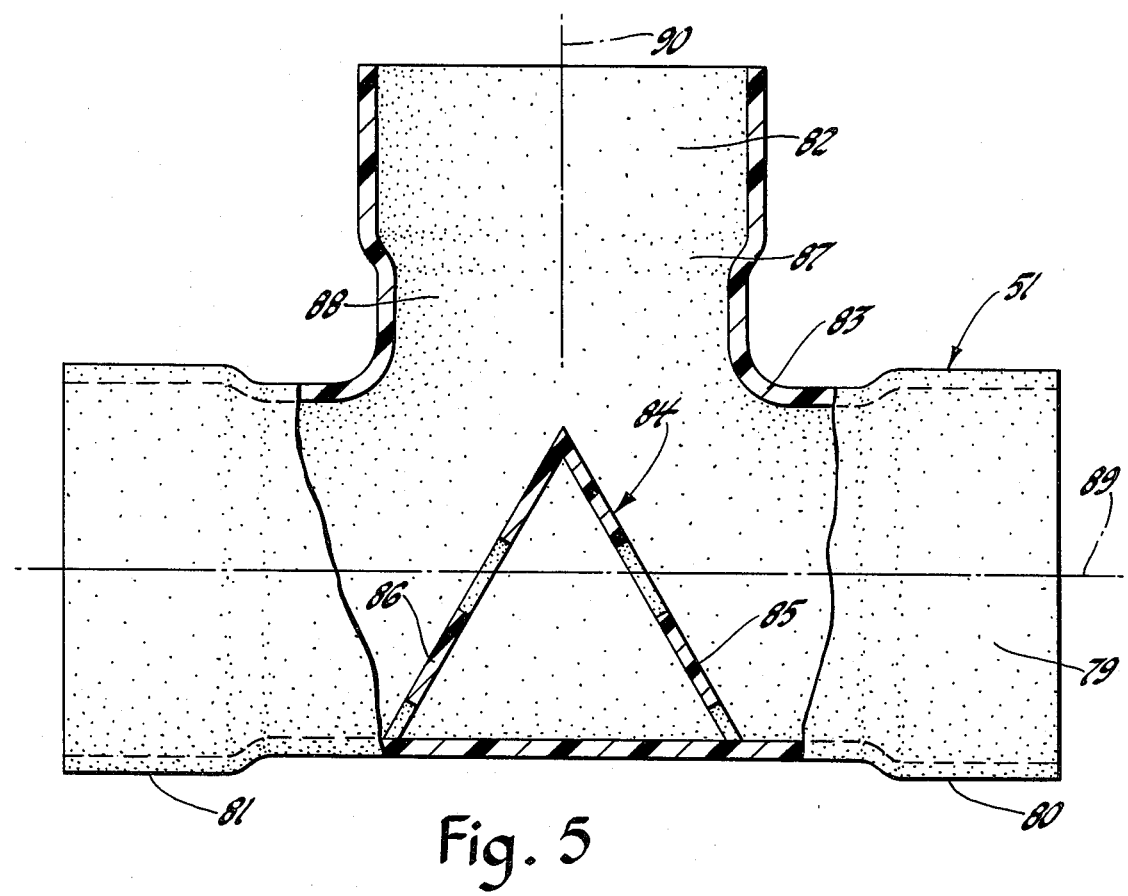
FIG. 5 is a cross section view of a tee fitting shown in FIG. 1.

As shown in FIG. 5, the tee fitting 51 has a first passageway 79 defined by a first end 80 and a second end 81. The tee fitting 51 also has a second passageway 82 which intersects the first passageway 79 at a junction 83, at which point fluid in each of the passageways 79 and 82 may flow between passageways without interruption.

As shown in FIG. 5, a baffle 84 is positioned in the first passageway 79 and has a first snake deflecting surface 85 and a second snake deflecting surface 86 which are inclined to fluid flow in the respective first and second ends 80 and 81 of the first passageway 79. The first snake deflecting surface 85 is also inclined to fluid flow in a first cross section area 87 in the second passageway 82 and the second snake deflecting surface 86 is also inclined to fluid flow in a second cross section area 88 of the second passageway 82.

While the second fitting described in detail in the illustrated embodiment is the tee fitting 51 and the respective axes 89 and 90 of the first and second passageways 79 and 82 are at right angles to each other, the configuration of the tee fitting 51 could be changed so the axes 89 and 90 are at a different angle to each other without departing from the spirit of the invention. Similarly, the axes 66 and 67 of the first passageway 63 in the clean-out elbow fitting 47 could be positioned at a different angle to the axes of the tube 68 without departing from the spirit of the invention. For example, the clean-out elbow fitting could be provided in the shape of a "Y" rather than as illustrated.

Persons versed in the art will also appreciate that the baffle 84 in the tee fitting 51 could be positioned in the second passageway 82 rather than in the first passageway 79 without departing from the spirit of the invention, although such repositioning of the baffle 84 would only provide for deflecting a snake entering the tee fitting 51 through the second passageway 82 as it would not deflect a snake entering the tee fitting 51 through the first passageway 79.

Figure 6:
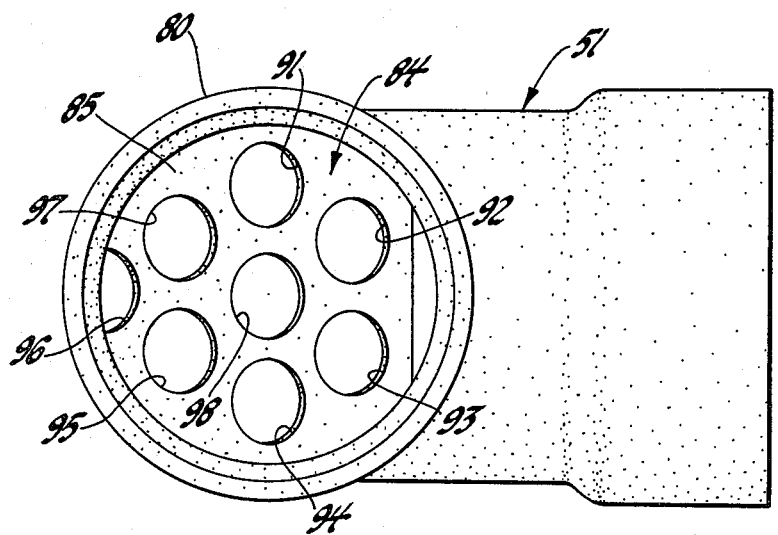
FIG. 6 is an end view of the tee fitting shown in FIG. 5.

As shown in FIG. 6, when looking at the end 80 of the tee fitting 51 the baffle 84 is illustrated as having a plurality of holes 91 through 98 extending through both the first snake deflecting surface 85 and the second snake deflecting surface 86. The size of the holes 91 through 98 is selected to be too small to permit a snake of the type usually used to clean the system 10 from passing through any of the holes 91 through 98. The holes 91 through 98 are provided to permit fluid flow through the baffle 84 without interfering with the primary snake deflecting function of the baffle 84.

The operation of the snake cleanable fluid flow system will now be described by assuming that there is a blockage believed to exist in either the perforated pipe 17 or the perforated pipe 23.

To remove such a blockage, a snake is inserted in the first side 76 of the partitioned pipe 55. The partition 59 cooperates with the side of the pipe 55 to guide the snake into the first cross section area of the second passageway 69 in the clean-out elbow fitting 47. The snake is thus directed at the first snake deflecting surface 72 and deflected into the first tubular end 64 of the clean-out elbow fitting 47 and passes through the first passageway 63 substantially parallel to the first axis 66. The snake then passes through the perforated pipe 17, clearing any blockage in the perforated pipe 17.

After passing through the perforated pipe 17, the snake enters the tee fitting 51 along the axis 89 in the first passageway 79 at the first end 80. The snake strikes the first snake deflecting surface 85 and is thus deflected into a first cross section area 87 of the second passageway 82 and passes out of the tee fitting 51 substantially parallel to the axis 90 and passes into the perforated pipe 23.

By referring to the fluid flow system 10 in FIG. 1, it is apparent that if a snake of sufficient length is inserted in the first side 76 of the partitioned pipe 55 it will pass in the manner aforedescribed through several elements in the interior drain apparatus to the sump basin 44.

Since each section of the fluid flow system 10 functions in a similar manner to that aforedescribed, it is not necessary to describe the operation of each section. It suffices to note that if a snake is inserted in the second side 77 of the partitioned pipe 55, the snake passes in the manner aforedescribed through the second tubular end 65 of the clean-out elbow fitting 47 and thus through the second end of the first passageway 63 and the perforated pipe 16 into the tee fitting 54. A baffle in the tee fitting 54 deflects the snake through the perforated pipe 22 in the manner aforedescribed. Similarly, insertion of a snake in either side of the partitioned pipes 56 through 58 in the illustrated embodiment will result in successive deflection of the snake in both a clean-out elbow fitting and a tee fitting. By knowing the configuration of the fluid flow system 10, a person can easily use a snake to clean all lines and fittings in the entire system 10. This can be accomplished by inserting a snake in the appropriate partitioned pipes 55 through 58 that are each provided at ground level. There is thus no need to excavate any part of the fluid flow system 10, which would be particularly expensive if a fluid flow system like the fluid flow system 10 were used in a climate where the ground froze to a hard texture.

Persons versed in the art will appreciate that various modifications of the apparatus incorporated in the fluid flow system may be made without departing from the spirit of the invention. For example, the various snake deflecting surfaces which are inclined to fluid flow and snake travel may be curved rather than straight to facilitate guiding and directing a snake in a predetermined direction in a manner similar to that described. Persons versed in the art will also appreciate that the partition in the partitioned pipes 55 through 58 may be perforated to provide fluid drainage and the exterior wall of the pipes 55 through 58 may also be perforated to provide additional drainage. So long as such perforations do not permit the passage of a snake through the partitions 59 through 62 or through the walls of the partitioned pipes 55 through 58, such modification would not affect the operation of the subject system.

What is claimed is:

1. A snake cleanable fluid flow system comprising, in combination, a tee defined by a first passageway having first and second ends and a second passageway which intersects said first passageway; a baffle in said tee for deflecting a snake entering said tee first passageway first end and for deflecting a snake entering said tee first passageway second end into said second passageway; an elbow defined by a first passageway having first and second ends and a second passageway intersecting said elbow first passageway and having a cross section that includes first and second sides; a baffle in said elbow for deflecting a snake entering said first side of said elbow second passageway into said elbow first passageway first end and for deflecting a snake entering said second side of said elbow second passageway into said elbow first passageway second end; pipe means for connecting one of said elbow first passageway ends to one of said tee first passageway ends whereby a snake inserted in one side of said elbow second passageway is deflected by said elbow baffle through said elbow first passageway, said one elbow first passageway end, said pipe means and said one tee first passageway end and is deflected by said tee baffle into said tee second passageway.

2. Apparatus for use in a snake cleanable fluid flow system comprising, in combination, a tee having a first passageway having first and second open ends and a second passageway communicating with said first passageway at an angle thereto; a baffle positioned in said first passageway substantially at the intersection of said first and second passageway, said baffle including a first inclined surface adjacent said first passageway first end so as to deflect a snake inserted in said first passageway first end into a first section of said second passageway and a second inclined surface adjacent said first passageway second end for deflecting a snake inserted in said first passageway second end into a second section of said second passageway; and at least one hole in each of said inclined surfaces for permitting fluid flow through said baffle so as to permit fluid entering either end of said first passageway to flow through said baffle into the other end of said first passageway whereby fluid entering either of said passageways may flow into all parts of both passageways, said holes being too small for a snake to pass therethrough so a snake entering either passageway is deflected by one of said inclined surfaces into the other of said passageways.

3. Apparatus for use in a snake cleanable fluid flow system comprising, in combination, a pipe defined by a longitudinal axis, a partition positioned longitudinally in said pipe so as to define first and second cross section areas of said pipe, said partition being substantially parallel to the longitudinal axis of said pipe; a fitting having a first passageway defined by first and second ends and a second passageway communicating with said first passageway at a junction between said first passageway ends, said second passageway being connected to said pipe so as to communicate therewith; a baffle in said fitting, said baffle having a first surface inclined to fluid flow in said first cross section area of said pipe so as to deflect a snake inserted in said fitting through said first cross section area of said pipe into said first end of said first passageway, said baffle having a second surface inclined to fluid flow in said second cross section area of said pipe so as to deflect a snake inserted in said fitting through said second cross section area of said pipe into said second end of said first passageway whereby selective cleaning of said first passageway ends may be effected by selectively inserting a snake in said pipe on each side of partition.

4. The apparatus of claim 3 in which said baffle is positioned in said second passageway adjacent to said junction so as to selectively deflect a snake inserted in said fitting through said pipe and so as to not deflect a snake inserted in said fitting through said first passageway.

5. The apparatus of claim 3 in which at least one hole is formed in each of said baffle first and second surfaces so as to let fluid flow through said surfaces, said holes being smaller than said snake so as to not permit passage of said snake through said holes.

6. The apparatus of claim 3 in which at least one hole is formed in said partition so as to permit fluid flow through said partition, said holes being too small to let said snake pass therethrough.

7. Apparatus for use in a snake cleanable fluid flow system comprising, in combination, a first fitting having a first passageway defined by first and second ends and a second passageway intersecting said first passageway at a junction between said first and second ends so as to provide fluid flow communication between said second passageway and both of said first passageway ends; a baffle in said first fitting at said junction, said baffle including a first surface inclined to fluid flow in a first part of said second passageway and a second surface inclined to fluid flow in a second part of said second passageway, said first surface being inclined so as to deflect a snake inserted in said first fitting through said first part of said second passageway into said first passageway toward said first end, said second surface being inclined so as to deflect a snake inserted in said cleanout fitting through said second part of said second passageway into said first passageway toward said second end; a second fitting having a first passageway defined by first and second ends and a second passageway intersecting said second fitting first passageway at a junction between said second fitting first passageway ends so as to provide fluid flow communication between said second fitting second passageway and both of said second fitting first passageway ends; a baffle in said second fitting first passageway, said second fitting baffle including a first surface inclined so as to deflect a snake entering said second fitting through said second fitting first passageway first end into said second fitting second passageway, said second fitting baffle also including a second surface inclined so as to deflect a snake entering said second fitting through said second fitting first passageway second end into said second fitting second passageway; and at least one connection means connecting one end of said second fitting first passageway to one end of said first fitting first passageway whereby said first fitting, connection means, and second fitting may be cleaned by inserting a snake in said first fitting second passageway so that said snake is deflected by said first fitting baffle into said first fitting first passageway one end so as to pass through said connection means and enter said second fitting first passageway one end so as to be deflected by said second fitting baffle into said second fitting second passageway.

8. The apparatus of claim 7 in which said first fitting baffle is positioned in said first fitting second passageway.

9. The apparatus of claim 7 in which said second fitting baffle first and second surfaces are perforated with holes smaller than the cross section of said snake so as to permit fluid flow through said baffle surfaces and prevent snake passage therethrough.

10. Apparatus for use in a snake cleanable fluid flow system comprising, in combination, a fitting defined by a first passageway having first and second open ends and a second passageway communicating with said first passageway at a junction between said first and second ends of said first passageway; and a baffle in said first passageway at said junction for deflecting a snake inserted into one of said passageways into the other of said passageways, at least one hole being provided in said baffle for permitting fluid flow through said baffle, said holes in said baffle being too small to permit a snake passing through said baffle, said baffle thereby permitting fluid flow through said first passageway from said first end to said second end while deflecting a snake that is inserted into either of said passageways into the other of said passageways.

11. The apparatus of claim 10 in which said baffle is comprised of a first inclined surface for deflecting a snake inserted into said first passageway first end into a first side of said second passageway and a second inclined surface for deflecting a snake inserted into said first passageway second end into a second side of said second passageway.

12. The apparatus of claim 10 in which said baffle is comprised of a first inclined surface for deflecting a snake inserted into said fitting between said first passageway first end and a first side of said second passageway and a second inclined surface for deflecting a snake inserted into said fitting between said first passageway second end and a second side of said second passageway.

* * * * *